Figure 5:
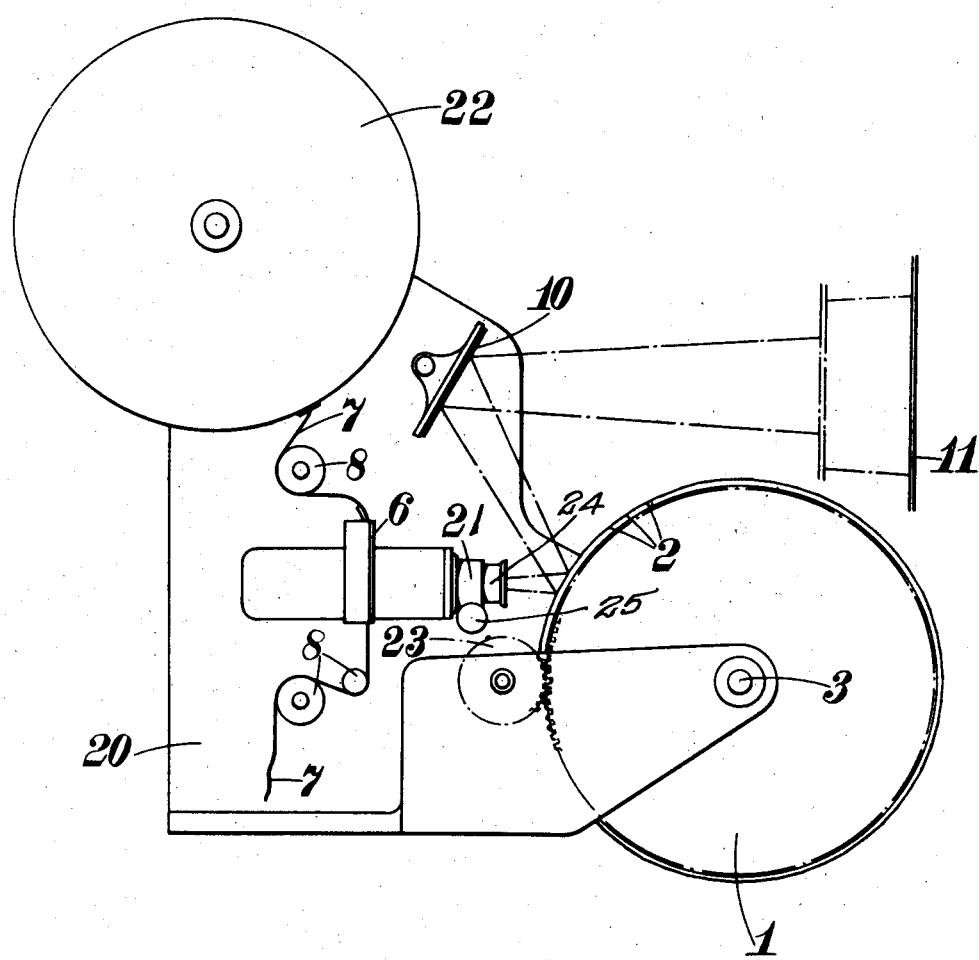

June 9, 1925.
K. HIGGINSON
CINEMATOGRAPHIC APPARATUS
Filed May 2, 1922    2 Sheets-Sheet 1
1,541,218
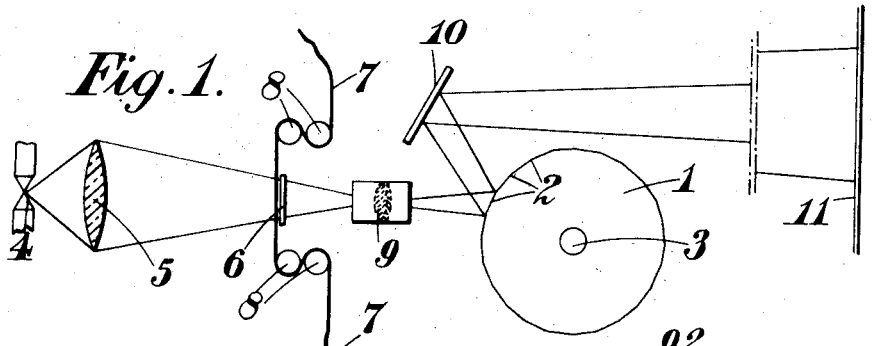
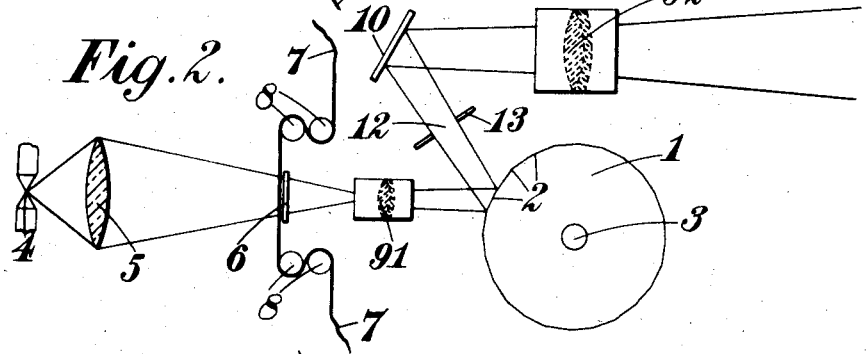
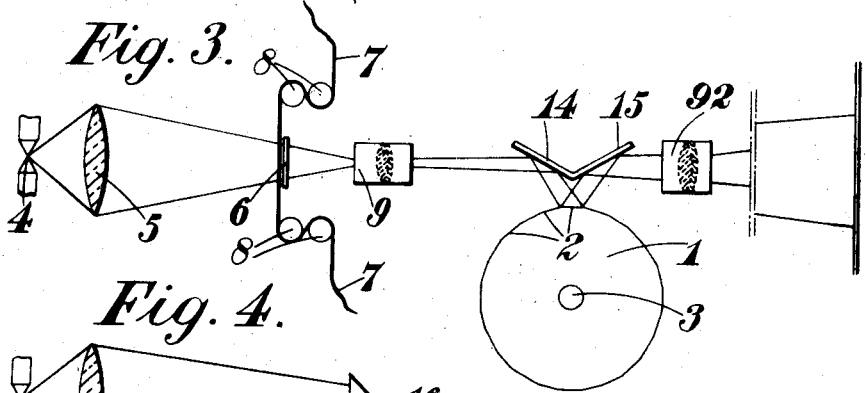
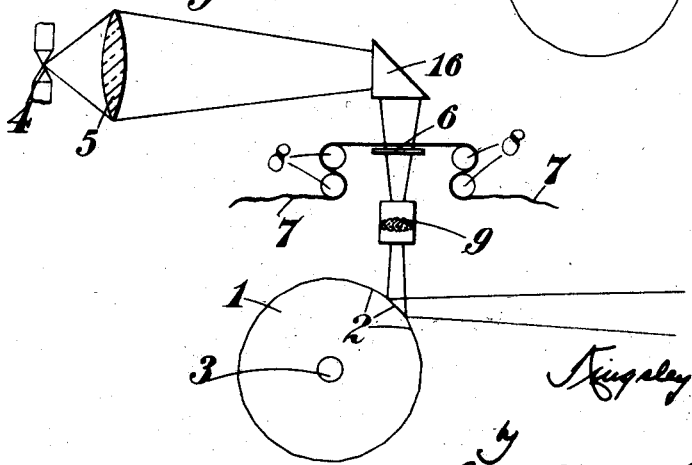

June 9, 1925.  1,541,218

K. HIGGINSON

CINEMATOGRAPHIC APPARATUS

Filed May 2, 1922   2 Sheets-Sheet 2

Patented June 9, 1925.

1,541,218

UNITED STATES PATENT OFFICE.

KINGSLEY HIGGINSON, OF LONDON, ENGLAND, ASSIGNOR TO CAREY-GAVEY SYNDICATE LIMITED, OF LONDON, ENGLAND, A BRITISH COMPANY.

CINEMATOGRAPHIC APPARATUS.

Application filed May 2, 1922. Serial No. 557,837.

*To all whom it may concern:*

Be it known that I, KINGSLEY HIGGINSON, a British subject, residing in London, England, have invented certain new and useful Improvements in Cinematographic Apparatus, of which the following is a specification.

This invention relates to cinematographic apparatus of the kind in which a rotating mirror has an external polygonal surface employed as a reflecting surface to receive the projected beam from a film which is moved continuously and synchronously with the rotation of the mirror, from which latter the projected beam is reflected on to the screen in such a way that there is always at least one complete picture upon the screen, either that projected from a single entire picture in the gate on to a single facet, or one composed of portions of two pictures each partly in the gate and correctly juxtaposed upon the screen by two facets of the mirror.

In apparatus of the kind referred to known heretofore the facets constituting the reflecting surface of the rotating mirror were all set at an angle to the axis of rotation. These facets were consequently trapezoidal, and they reflected on to the screen at a point to one side of the film the incident picture beam which was directed along a line radial of the mirror and in the general plane of rotation of the mirror. Owing to the facets constituting each a side of a frustum of a polygonal pyramid, the upper edge of each facet had a greater angular velocity than the lower when the mirror was rotated, and the plane containing each facet was moved not only about the axis of rotation of the mirror, but also about a horizontal axis when moving from one side to the other. Hence defects of reproduction were caused on the screen, and this invention has for its object to provide cinematographic apparatus of the type described to which such defects are not attached.

The present invention provides cinematographic apparatus of the type described characterized by the reflecting surface of the rotatable mirror being constituted by rectangular facets each having its plane parallel to the axis of rotation of the mirror.

This invention includes a construction such as is just above defined and wherein for the purpose described the objective lens of the projector is constructed to have its focal length adjustable within limits not exceeding 10% above and 10% below its normal value, and preferably not more than 3% above and below.

Apparatus according to this invention may further comprise reflecting means to receive the beam from the polygonal mirror and direct it on to the screen, with or without other reflecting means between the projector and the polygonal mirror to bring the beam from the former on to the latter.

It is also within this invention to construct apparatus such as has above been defined and having, moreover, a portion at least of the optical refracting system situated between the polygonal mirror and the screen.

Yet another construction provided by this invention is one wherein refracting means are provided between the film and the polygonal mirror so arranged that an image is thereby produced at a point in space between the polygonal mirror and the screen, masking means are provided at the said point for the said image and other refracting means are arranged to project the said image on to the screen.

In the accompanying drawings four ways of carrying out this invention are indicated, Figure 1 being a diagram of the preferred arrangement of the parts, and Figures 2, 3 and 4 diagrams similar to Figure 1 of alternative arrangements, the screen being omitted in these three diagrams.

Figure 5 shows one constructional form of apparatus according to the invention arranged as shown diagrammatically in Figure 1.

Like reference numerals refer to like parts throughout the drawings.

In the construction shown diagrammatically in Figure 1, a mirror 1 is prepared in the form of a structure whose external surface is polygonal, each facet 2 thereof being constituted by a plane rectangular mirror. The mirror is supported to rotate about a horizontal axis 3 at right-angles to the general plane of the polygon forming its reflecting surface. To one side of the mirror is arranged the projection lamp, of which the source of light is indicated at 4, the condenser at 5, the gate at 6 and the film and film-rollers at 7 and 8 respectively. The objective lens of the projector is indicated at 9 and serves to throw the beam in a mean horizontal direction on to the mirror along a line that is not a radial line of the mirror but is parallel to and above such a line in the general plane of, and of the rotation of, the mirror.

A plane reflector 10 is mounted above the annular mirror and towards the same side of it as that on which the projector lies. The angle of the reflector 10 is so adjusted with relation to the portions already referred to that the beam, after reflection by it, proceeds in a mean horizontal direction to fall upon the screen which is indicated at 11.

As shown in Figure 5, the mirror 1 and the reflector 10 are mounted on the same support 20 whereon are mounted the objective lens of the projector and its casing as shown at 21, the gate 6, the feed-sprockets 8 for the film 7 and the feed-roll 22 of the film. The mirror 1 is driven by a toothed-gear-wheel 23 which can be driven in any convenient manner in synchronism with the continuously moving film 7.

In the modification shown in Figure 2, the objective lens system is arranged in two portions 91 and 92, of which the portion 91 lies between the gate and the annular mirror, and the portion 92 between the reflector 10 and the screen.

The lens portion 91 and the facets 2 of the annular mirror 1 combine to produce an image of the picture in the gate 6, at the point 12. At this point a mask 13 is provided. The lens portion 92 in co-operation with the reflector 10 focus upon the screen the image that is at 12 in the mask 13.

In the modification shown in Figure 3 the projector is arranged to throw the picture-beam along a horizontal line lying in the plane of rotation of the mirror and above it, and two stationary reflectors 14 and 15 are interposed, namely the reflector 14 between the objective lens 9 and the polygonal mirror 1 to divert the beam downwardly on to the latter, and the reflector 15 to receive the beam after reflection at the top of the mirror and redirect it into a horizontal direction on to the screen. All refractive means provided between the film and the screen may be arranged at 9.

The third modification shown in Figure 4 is one in which the gate 6 is arranged with its plane horizontal so that the path of the film through it is horizontal but the gate is arranged above the polygonal mirror 1, not vertically above it, but slightly on the screen side of a vertical line through the axis of rotation of the mirror, the plane of rotation of the latter being vertical as in the preceding instances. In order to give a downward direction to the beam which is for the sake of convenience projected horizontally in the usual manner, a right-angled prism or other stationary reflector 16 is arranged above the gate.

In any case, it is desirable to employ an objective lens capable of having its focal length varied between narrow limits, limits not exceeding 10% above and 10% below the normal focal length of the lens. Variations in the said lengths amounting only to 2% or 3% thereof suffice, it is found, to enable the apparatus to be employed for different distances of projection varying with relation to one another to a degree largely in excess of the said 2% or 3%, and without disturbing the necessary relations between the elements of the lens to a degree which exceeds the limits of tolerance.

In all of the various forms of the invention illustrated, the objective lens is mounted for focusing in the usual manner by shifting it bodily in the projector. One way of mounting the lens for focusing is illustrated in Figure 5, wherein 21 designates the lens casing and 24 the mount for the lens having a tight sliding fit in the casing. By means of a screw 25, the mount 24 can be adjusted to move the objective lens bodily with respect to the condenser 5 in the direction of the optical axis of the lens.

It is to be understood that the employment of an objective lens system in two portions as shown in Figure 2 and masking means as at 13 may also be adopted with the arrangements of Figures 1, 3 and 4.

What I claim as my invention and desire to secure by Letters Patent is:

1. In cinematograph apparatus of the character described, the combination of a cinematograph projector wherein the film is moved continuously through the gate, and a rotatable mirror having an external surface of regular polygonal form constituted by a plurality of rectangular mirrors arranged side by side and having each its plane parallel to the axis of rotation of the mirror, which mirror is so disposed as to intercept the beam from the projector along a line other than a radial line of the mirror and reflect the beam towards a screen, the optical refracting system constituting the objective lens of said projector being constructed to have its focal length adjustable within limits less than 10% above and below its normal value and arranged to be moved for focusing purposes toward and away from the gate.

2. In cinematograph apparatus of the character described, the combination with a cinematograph projector wherein the film is moved continuously through the gate, of a rotatable mirror having an external surface of regular polygonal form constituted by a plurality of rectangular mirrors arranged side by side and having each its plane parallel to the axis of rotation of the mirror, which mirror is so disposed as to intercept the beam from the projector along a line other than a radial line of the mirror, the optical refracting system constituting the objective lens of said projector being constructed to have its focal length adjustable within limits less than 10% above and below its normal value and arranged to be moved for focusing purposes toward and away from the gate, and a reflector arranged to receive the beam reflected from the mirror and throw it on to a screen.

3. In cinematograph apparatus of the character described, the combination of a cinematograph projector wherein the film is moved continuously through the gate, of a rotatable mirror having an external surface of regular polygonal form constituted by a plurality of rectangular mirrors arranged side by side and having each its plane parallel to the axis of rotation of the mirror, which mirror is so disposed as to intercept the beam from the projector along a line other than a radial line of the mirror, the optical refracting system constituting the objective lens of said projector being constructed to have its focal length adjustable within limits less than 10% above and below its normal value and arranged to be moved for focusing purposes toward and away from the gate, and a reflector arranged to receive the beam reflected from the mirror and throw it on to a screen in a direction substantially parallel to that of the beam emerging from the projector.

4. In cinematograph apparatus of the character described, the combination of a cinematograph projector, wherein the film is moved continuously through the gate, and having an optical refracting system comprising two separate portions so arranged that the focal length of the system can be adjusted within limits less than 10% above and below its normal value and arranged to be moved for focusing purposes toward and away from the gate, a rotatable mirror having an external surface of regular polygonal form constituted by a plurality of rectangular mirrors arranged side by side and having each its plane parallel to the axis of rotation of the mirror, which mirror is so disposed as to intercept the beam from the projector along a line other than a radial line of the mirror and reflect the beam towards a screen, one of said portions of the optical refracting system being situated in the path of the beam after it has been reflected by the mirror.

5. In cinematograph apparatus of the character described, the combination of a cinematograph projector, wherein the film is moved continuously through the gate, and having an optical refracting system comprising two separate portions so arranged that the focal length of the system can be adjusted within limits less than 10% above and below its normal value and arranged to be moved for focusing purposes toward and away from the gate, a rotatable mirror having an external surface of regular polygonal form constituted by a plurality of rectangular mirrors arranged side by side and having each its plane parallel to the axis of rotation of the mirror, which mirror is so disposed as to intercept the beam from the projector along a line other than a radial line of the mirror, and a reflector arranged to receive the beam reflected from the mirror and throw it towards a screen, one of said portions of the optical refracting system being situated in the path of the beam reflected by the reflector.

6. In cinematograph apparatus of the character described, the combination of a cinematograph projector, wherein the film is moved continuously through the gate, and having an optical refracting system comprising two separate portions so arranged that the focal length of the system can be adjusted within limits less than 10% above and below its normal value and arranged to be moved for focusing purposes toward and away from the gate, a rotatable mirror having an external surface of regular polygonal form constituted by a plurality of rectangular mirrors arranged side by side and having each its plane parallel to the axis of rotation of the mirror, which mirror is so disposed as to intercept the beam from the projector and reflect it along a line which is parallel to and above a radial line of the mirror and is situated in the general plane of, and in the plane of rotation of the mirror, one of said portions of the optical refracting system being situated in the beam reflected by the mirror, the said parts being so arranged that an image is produced at a point in space between the mirror and the screen, and masking means arranged at the said point for the said image.

In testimony whereof I affix my signature.

KINGSLEY HIGGINSON.